C. W. BURGE.
CHAIN FASTENER.
APPLICATION FILED APR. 27, 1921.
1,394,666.
Patented Oct. 25, 1921.
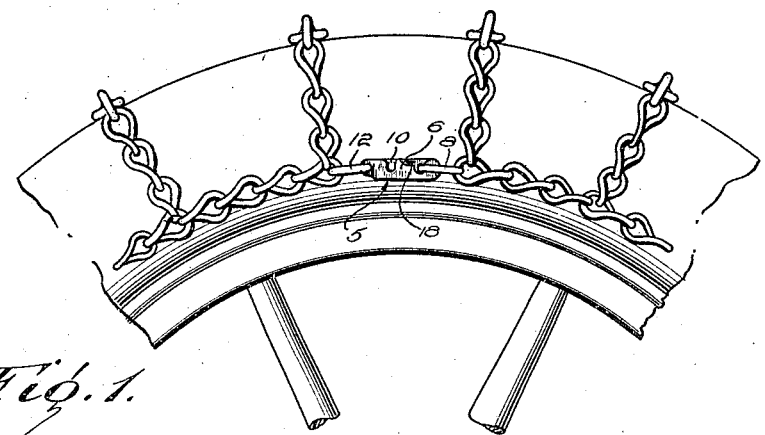
Fig. 1.
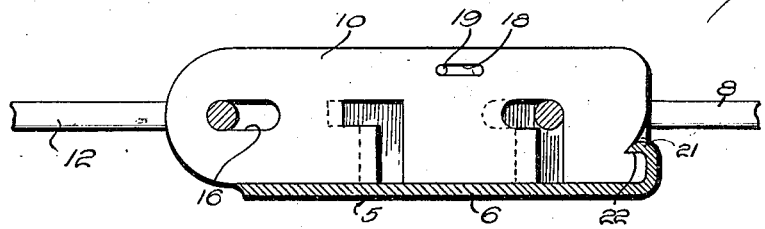
Fig. 2.
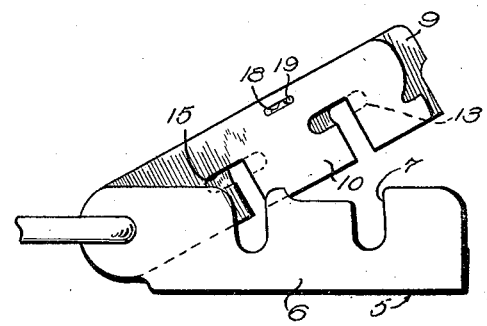
Fig. 3.
Fig. 5.
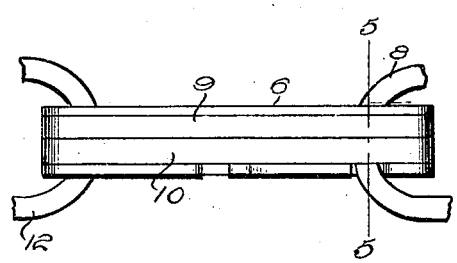
Fig. 4.
Inventor
Clarence W. Burge.

UNITED STATES PATENT OFFICE.

CLARENCE W. BURGE, OF PARKERSBURG, WEST VIRGINIA.

CHAIN-FASTENER.

1,394,666.  Specification of Letters Patent.  Patented Oct. 25, 1921.

Application filed April 27, 1921. Serial No. 464,943.

*To all whom it may concern:*

Be it known that I, CLARENCE W. BURGE, a citizen of the United States, residing at Parkersburg, in the county of Wood and State of West Virginia, have invented certain new and useful Improvements in a Chain-Fastener, of which the following is a specification.

This invention relates to hooks especially adapted for connecting the meeting ends of a tire chain.

An important object of this invention is to provide a terminal link or hook for tire chains having novel means whereby the same is engaged with the end link of the chain so as to prevent accidental disconnection of the device with the chain.

A further object is to provide a terminal link or hook having simple means whereby the same is absolutely prevented from accidentally opening when applied.

The invention forming the subject matter of this application aims also to provide a terminal link for tire chains which is simple to apply, efficient in use and cheap to manufacture.

Other objects and advantages of the invention will be apparent during the course of the following description.

In the accompanying drawing forming a part of this application, and in which like numerals are employed to designate like parts throughout the same, Figure 1 is a side elevation of the improved terminal link applied.

Fig. 2 is a longitudinal sectional view through the same.

Fig. 3 is a side elevation of the link open.

Fig. 4 is a plan view of the link.

Fig. 5 is a transverse section on line 5—5 of Fig. 4.

In the drawing, the numeral 5 designates a case which is substantially U-shaped in cross section and which includes a pair of spaced parallel sides 6 having rearwardly inclined slots 7 opening out through their upper edges for the reception of one end of a link 8.

As illustrated in Fig. 4, locking bars 9 and 10 are adapted to coact with the case 6 in holding the link in engagement with the device and are arranged flatly in contact with each other. The locking bar 9 is pivotally connected to the case by means of one end of a link 12 which is extended through the rear end of the case and forms a means whereby the improved terminal link may be permanently connected to the tire chain.

The locking bar 9 is provided with a pair of spaced bayonet slots 13 having branches which extend at right angles to each other and which are adapted to receive one end of the link 8.

The locking bar 10 is also provided with a pair of bayonet slots 15 having longitudinal and transverse branches adapted to register with the branches of the plate 9 whereby the link 8 may be inserted into the transverse branches of the locking bars and then into the longitudinal branches of the same.

With reference to Fig. 2 it will be observed that the locking bar 10 is formed at its rear end with a longitudinal slot 16 which slidably and pivotally receives the forward portion of the link 12 whereby the locking bar 10 may slide with relation to the locking bar 9 for removing the transverse slots of one plate from registration with the transverse slots of the other plate. With the transverse slots in the two plates thus moved out of register the link 8 is securely connected to the two locking bars and is securely held against displacement. The locking bar 10 is formed with a longitudinal slot 18 which slidably receives a stop pin 19 projecting laterally from the intermediate portion of the other lock bar whereby the sliding movement of one bar with relation to the other is limited.

Subsequent to inserting one end of the link 8 in the transverse slots of the bars, the bars are moved into the case and the bar 10 is then advanced so that a bill 21 projecting rearwardly from the forward portion of the case is received within a notch 22 in the forward end of the locking bar 10.

Upon advancing the locking bar 10 into engagement with the bill 21 the bars 9 and 10 are securely held within the case whereby the disconnection of the link is prevented.

When it is desired to open the link the locking bar 10 is moved rearwardlly so as to form the double function of removing the same from engagement with the bill 21 and of bringing the transverse slots of the bars in registration.

Having thus described the invention, what is claimed is:—

1. A terminal link comprising a casing, lock bars pivotally carried thereby and provided with bayonet slots having longitudinal and transverse branches adapted for the reception of a link, means slidably connecting the links, and a bill arranged in the path of travel of one of the lock bars.

2. A terminal link comprising a casing, a pair of lock bars pivotally carried thereby and provided with slots adapted for registration, one of said bars being slidable with relation to the other bar and the casing and formed with a notch, and a bill carried by one end of said casing and adapted to be received within said notch.

3. A terminal link comprising a casing, a pair of lock bars pivotally carried thereby and provided with bayonet slots having longitudinal branches, one of said bars being slidable with relation to the other bar and having its forward end formed with a notch, and a rearwardly directed bill carried by the casing and adapted to be received within said notch and means limiting the sliding movement of said sliding lock bar, said means consisting of a stop pin carried by one of the bars and a slot formed in the other bar and receiving the stop pin.

In testimony whereof, I have affixed my signature in the presence of two witnesses.

CLARENCE W. BURGE.

Witnesses:
J. E. DEAN,
T. B. POWELL.